(12) United States Patent
Heigl et al.

(10) Patent No.: US 7,012,406 B2
(45) Date of Patent: Mar. 14, 2006

(54) METHOD OF PERIODIC REFRESH CHARGING OF STORAGE BATTERY PACKS

(75) Inventors: Bernd Heigl, Augsburg (DE); Bernd Ziegler, Hiltenfingen (DE)

(73) Assignee: Hilti Aktiengesellschaft, Schaan (LI)

( * ) Notice: Subject to any disclaimer, the term of this patent is extended or adjusted under 35 U.S.C. 154(b) by 174 days.

(21) Appl. No.: 10/726,916

(22) Filed: Dec. 3, 2003

(65) Prior Publication Data
US 2004/0169491 A1   Sep. 2, 2004

(30) Foreign Application Priority Data
Dec. 4, 2002   (DE) .............................. 102 56 545

(51) Int. Cl.
*H01M 10/44* (2006.01)

(52) U.S. Cl. .................................................. 320/137
(58) Field of Classification Search ................ 320/125, 320/131, 132, 150, 160, 130, 137, 155
See application file for complete search history.

(56) References Cited

U.S. PATENT DOCUMENTS

| | | | | |
|---|---|---|---|---|
| 5,254,931 A | * | 10/1993 | Martensson | 320/114 |
| 5,712,795 A | | 1/1998 | Layman et al. | |
| 5,942,878 A | * | 8/1999 | Ito | 320/DIG. 21 |
| 6,483,272 B1 | | 11/2002 | Terada | |
| 6,661,201 B1 | * | 12/2003 | Ueda et al. | 320/131 |
| 2002/0167296 A1 | * | 11/2002 | Nagata et al. | 320/155 |

FOREIGN PATENT DOCUMENTS

| | | |
|---|---|---|
| EP | 450783 | 10/1991 |
| EP | 818869 | 1/1998 |
| EP | 1328055 | 7/2003 |

* cited by examiner

*Primary Examiner*—Edward H. Tso
(74) *Attorney, Agent, or Firm*—Abelman, Frayne & Schwab

(57) ABSTRACT

A charging method for a battery pack with each of the at least two series-connected cells being supplied with an effective charging current ($I_{Charge}$), in a charging cycle (1) over a charging period, and being supplied with a lower effective refresh current. ($I_{refresh}$), in an at least occasional subsequent refresh cycle (2) over a refresh charging cycle (6). The refresh cycle (2) follows after a period (K) in a number (M) of charging cycles (1).

16 Claims, 1 Drawing Sheet

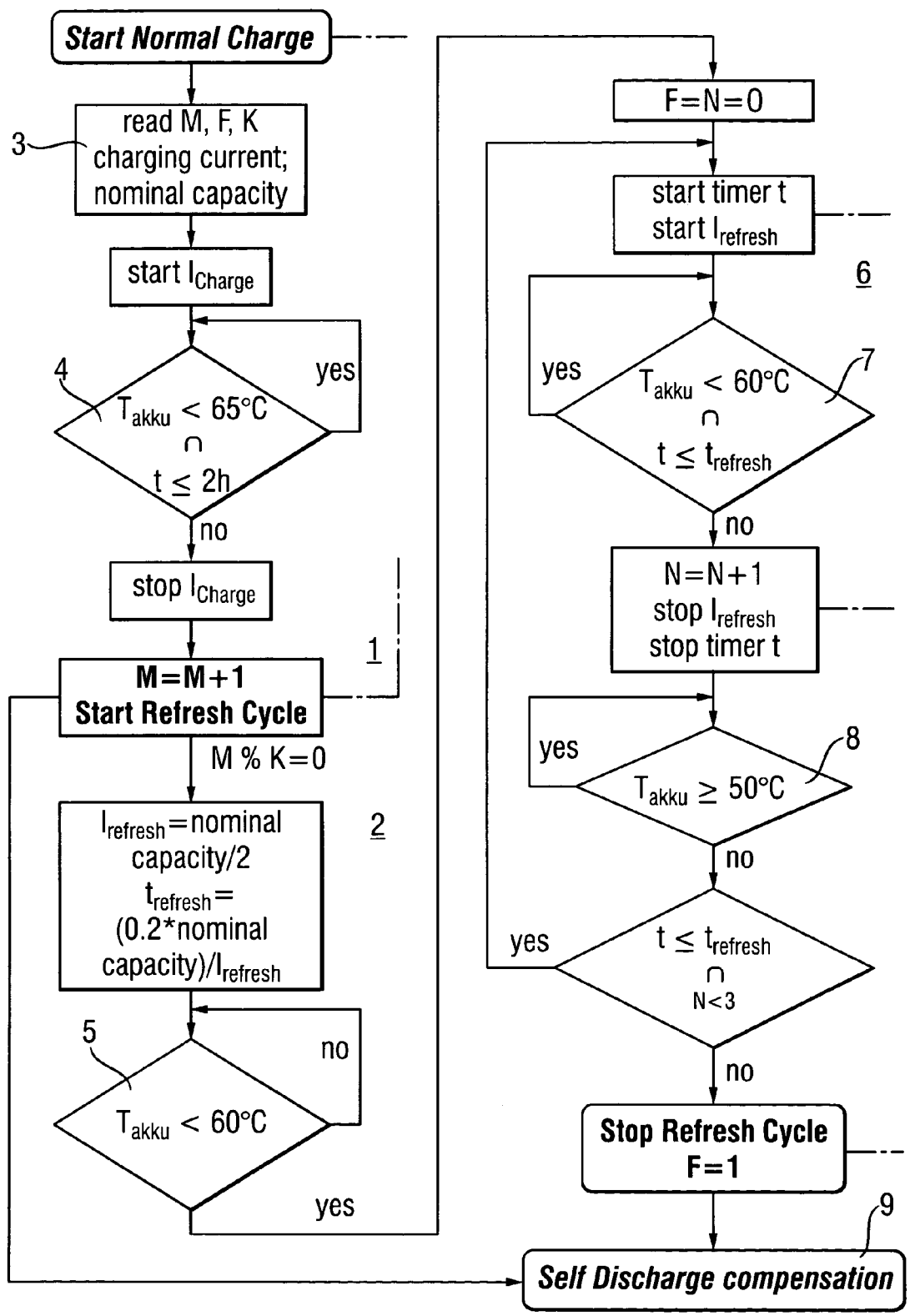

METHOD OF PERIODIC REFRESH CHARGING OF STORAGE BATTERY PACKS

BACKGROUND OF THE INVENTION

1. Field of the Invention

The invention relates to a method for charging storage battery packs, in particular NiCd and NiMH battery backs for electrical hand tool machines.

In particular, it must be possible to recharge NiCd and NiMH battery backs for electrical hand tool machines to almost continually use the electrical hand tool by exchanging one battery pack for another. Nonetheless, critical values specific to the battery, in particular the temperature at the time of charging, must be taken into account to obtain an adequate service life of the NiCd battery pack. Associated charger devices usually monitor the temperature of the battery pack by a temperature sensor arranged in the battery pack.

2. Description of the Prior Art

Battery packs comprise a number of cells that are at least partially connected in series with each other. Accordingly, the identical current flows through all of these cells at the time of use and at the time of charging. The usable capacity of a battery pack is consequently determined by the capacity of the weakest cell, which limits the service life of the battery pack. The battery pack must be regularly regenerated in a refresh cycle to obtain the desired increase in capacity, especially of the weakest cell. These type of refresh cycles usually consist of individual refresh cycles and optional refresh discharge cycles using a comparatively low current strength of less than 50% relative to the charging cycle.

According to EP 450 783, a refresh cycle using approximately 100 mA following charging using approximately 700 mA is carried out independently of the charge status of a battery, which can be automatically enabled by the microcontroller in the consumer. According to U.S. Pat. No. 6,191,554, a double charge/discharge of the NiCd battery and update of the data memory arranged in the battery is done in a manually enabled, pre-programmed refresh cycle.

According to U.S. Pat. No. 6,154,008, in a NiCd battery pack for electrical hand tool machines, following temperature—controlled charging at 50° C. for approximately 2 h, a manually enabled refresh cycle enabled by a refresh switch over a period of from 4 to 8 h using a low refresh current effects an overcharge. Especially in the rough construction trades, a refresh in a manually selectable refresh cycle is frequently done too often or inadequately, whereby the possible service life of the battery pack is not attained. In addition, the refresh cycle requires too much time and thus a quasi-continuous utilization is not possible when changing over.

SUMMARY OF THE INVENTION

The object of the invention is to provide a charging method for a battery pack that makes possible an adequate service life with short charge times.

This object is achieved essentially, in a charging operation for a battery pack, an effective charging current flows through each of the at least two cells connected in series in a charging cycle over a charging time and, in an at least occasionally subsequent refresh cycle, an effective refresh current flows through same over a refresh charging cycle, whereby the refresh cycle follows after a period of time in a number of charging cycles, advantageously after a pre-defined period of 50 charging cycles.

By virtue of the subsequent refresh cycles that follow periodically in a number of charging cycles, the overcharging necessary for an adequate service life with short charging times is done using a pre-defined overcharge capacity for regenerating the weakest cell as a factor of usage.

Advantageously, the number of charge cycles, further advantageously in addition to the completion of the last refresh cycle, is stored in a charger—associated readable—writable data memory contained in the battery pack, whereby the battery pack itself contains its regeneration status.

Advantageously, the effective refresh current is quantitatively at least half of the per hour charging current, whereby upon overcharging using a predefined overcharge capacity the unnecessarily long refresh times using the usual low effective refresh current can be avoided. In experiments, the dominant parameters of the overcharge capacity were demonstrated.

Advantageously, the effective refresh current is at least a battery nominal capacity/4 h, further advantageous a battery nominal capacity/2 h, whereby overcharging can be done in a short time.

Advantageously, the refresh time is at least 20 min and a maximum of 0.4*battery nominal capacity/refresh current, further advantageously 0.2*battery nominal capacity/refresh current, whereby an at least 10% overcharge capacity is attained.

Advantageously, during this charging cycle and/or during the refresh cycle, the temperature of the battery back measured by a sensor is monitored by a control element and upon exceeding a critical temperature the effective current is reduced or interrupted, whereby damage to the cells is prevented.

Advantageously, the refresh cycle begins only after falling below a refresh start temperature, further advantageously of 60° C., whereby a battery pack that is overheated in the charging period can cool down.

Advantageously, within the refresh cycle at least two, further advantageously exactly three, temporally spaced refresh charging cycles are available, between which the battery pack can cool down.

Advantageously, at least one refresh charging cycle upon reaching a refresh maximum temperature, further advantageously of 60° C., is prematurely interrupted, whereby the refresh time is shortened.

Advantageously, an optional additional refresh charging cycle begins upon falling below a refresh minimum temperature, further advantageously of 50° C., whereby the sequence of the refresh charging cycle occurs under temperature control.

Advantageously, the refresh cycle is automatically started depending on the data stored in the data memory of the battery pack, whereby it is activated in the objective event required independently of the care and subjective estimation of the operator.

BRIEF DESCRIPTION OF THE INVENTION

The invention will be more completely described with reference to the drawings wherein FIG. 1 shows a flow chart of the charging operation in accordance with the invention.

DETAILED DESCRIPTION OF THE INVENTION

According to the flow chart of FIG. 1, in a charging operation for a battery pack (not shown) in a charging cycle 1, an effective current $I_{Charge}$ flows through over a period of time and, in an at least occasionally subsequent refresh cycle 2 over a refresh charging cycle $t_{refresh}$, a low effective refresh current $t_{refresh}$ flows through, whereby the refresh cycle 2 follows after a period K in the M number of charging cycles 1. In a readable-writable data memory (not shown) arranged in the battery pack, wherein in addition other characteristic values such as charging current (charge, rated capacity, $C_{nominal}$ etc.) are stored the number M of charging cycles 1, the period K, in addition, a flag F for the complete finish of the last refresh cycle 2 at the start 3 of the charging cycle 1 is read or at the end of the charging cycle 1 or refresh cycle 2 stored, appropriately changed.

The effective refresh current $I_{refresh}$ is quantitatively the half of the effective charging current $I_{Charge}$ and is the battery nominal capacity [is] $C_{nominal}/2$ h. The refresh time $t_{refresh}$ is 0.2*battery nominal capacity $C_{nominal}$/refresh current $I_{refresh}$. During the charging cycle 1, the charging control loop 4, which is monitored by means of a temperature $T_{akku}$ measured by a sensor (not shown) by a microcontroller (not shown) as the control element and upon exceeding a critical temperature of 65° C. or a critical charging time of 2 h the effective charging current $I_{Charge}$ is interrupted. Initially, in the refresh cycle 2 in the refresh start control loop 5 a falling below a refresh start temperature of 60° C. is awaited. There then follow, controlled by the counter N, exactly three run-throughs of temporally spaced refresh charging cycles 6, which are interrupted by the reference charging control loop 7 upon reaching a refresh maximum temperature of 60° C. or the refresh charging cycle $t_{refresh}$. An optimum further passage starts only upon falling below a refresh minimum temperature of 50° C., wherein the cooling control loop 8. After conclusion of the refresh cycle 2, a temporally unrestricted auto-discharge compensation 9 ties into a minimum maintenance current.

What is claimed is:

1. A method of refresh charging of a battery pack having at least two series-connected cells, comprising the steps of:
    feeding, in a charging cycle (1) over a charging period, an effective charging current ($I_{charge}$) to each of the at least two series-connected cells; and
    feeding, in a subsequent refresh cycle (2) that follows a period (K) in a number (M) of charging cycles (1), over a refresh charging cycle (6), a lower effective refresh current ($I_{refresh}$) to each of the at least two series-connected cells.

2. The charging method of claim 1, wherein in the charging cycle (1), the number (M) of charging cycles (1) and a flag (F) for the complete termination of the last refresh cycle (2) is stored in a readable-writable data memory associated with the charging unit and arranged in the battery pack.

3. The charging method of claim 1, wherein in the refresh cycle (2), the effective refresh current ($I_{refresh}$) is at least battery nominal capacity ($C_{nominal}$)/4 h.

4. The charging method of claim 3, wherein, in the refresh cycle (2), the refresh time ($t_{refresh}$) is at least 20 min and not more than 0.4 * battery nominal capacity ($C_{nominal}$)/refresh current ($I_{refresh}$) optionally a maximum of 0.2*battery nominal capacity ($C_{nominal}$)/refresh current ($I_{refresh}$).

5. The charging method of claim 4, wherein the temperature of the battery pack ($T_{akku}$) measured by a sensor is monitored by a control element during at least one of the charging cycle (1) and the refresh cycle (2), and wherein the temperature of the battery pack ($T_{akku}$) upon exceeding a critical temperature the effective current is one of reduced and interrupted.

6. The charging method of claim 5, wherein the refresh cycle (2) commences only after falling below a refresh start temperature.

7. The charging method of claim 6, wherein at least two temporally spaced refresh charging cycles (6) are available within the refresh cycle (2).

8. The charging method of claim 7, wherein at least one refresh charging cycle (6) is prematurely interrupted upon reaching a refresh maximum temperature.

9. The charging method of claim 7, wherein a further refresh cycle (6) starts upon falling below a refresh minimum temperature.

10. The charging method of claim 7, wherein the refresh cycle (2) is automatically started depending on the data (M, F, K, $C_{nominal}$, $I_{Charge}$) stored in the data memory of the battery pack.

11. The charging method of claim 3, wherein in the refresh cycle (2), the effective refresh current ($I_{refresh}$) is at least battery nominal capacity ($C_{nominal}$)/2 h.

12. The charging method of claim 4, wherein, in the refresh cycle (2), the refresh time ($t_{refresh}$) is a maximum of 0.2*battery nominal capacity ($C_{nominal}$)/refresh current ($I_{refresh}$).

13. The charging method of claim 6, wherein the refresh start temperature is 60° C.

14. The charging method of claim 7, wherein three temporally spaced refresh charging cycles (6) are available within the refresh cycle (2).

15. The charging method of claim 8, wherein the refresh maximum temperature is 60° C.

16. The charging method of claim 7, wherein the refresh minimum temperature is 50° C.

* * * * *